United States Patent Office 3,475,156
Patented Oct. 28, 1969

3,475,156
HERBICIDAL α-HALOACETANILIDES
John F. Olin, Ballwin, Mo., assignor to Monsanto Company, St. Louis, Mo., a corporation of Delaware
No Drawing. Continuation of application Ser. No. 644,412, Jan. 17, 1967, which is a division of application Ser. No. 397,637, Sept. 18, 1964. This application Nov. 13, 1968, Ser. No. 776,312
Int. Cl. A01n 9/20; C07c 103/34
U.S. Cl. 71—118   33 Claims

ABSTRACT OF THE DISCLOSURE

Phytotoxic compositions containing a compound of the formula

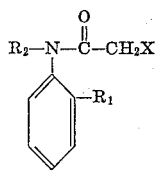

wherein $R_1$ is tertiary alkyl of from 4 to 10 carbon atoms, $R_2$ is selected from the group consisting of primary alkyl, alkenyl, and alkynyl of not more than 4 carbon atoms, and X is a halogen selected from the group consisting of chlorine, bromine and iodine.

---

This application is a continuation of application Ser. No. 644,412, filed Jan. 17, 1967, which in turn is a division of application Ser. No. 397,637, filed Sept. 18, 1964, now abandoned, which in turn is a continuation-in-part of application Ser. No. 134,094, filed Aug. 28, 1961, and now abandoned.

This invention relates to the control of plant systems, including germinating seeds, emerging seedlings, and fully developed plants. In one aspect, this invention relates to valuable herbicidal compositions. In another aspect, this invention relates to methods for destroying undesirable plant vegetation without substantially affecting desirable plant vegetation. In another aspect, this invention relates to methods for preventing the germination of seeds of undesirable plants and for preventing the growth of emerging seedlings of said plants. In another aspect, this invention relates to certain N-substituted ortho-substituted alpha-haloacetanilides as new compounds.

In recent years, the use of chemicals for affecting plant systems has found widespread acceptance among agriculturalists. For example, chemical compositions have been applied to fully develop vegetation to destroy the same in either a selective or nonselective manner. It is relatively easy to destroy the aerial portion of developed vegetation because the vegetation is brought into direct contact with the herbicide composition; however, it is sometimes more difficult to achieve a lethal effect on germinating seeds lying in the soil and seedlings emerging from the soil. Destruction of germinating seeds and emerging seedlings is important in preventing regrowth from the plants after the herbicide composition has either been washed away by rainfall or dissipated by other actions. Unfortunately, it is usually necessary to use an excessive amount of the herbicidal composition in order to affect the germinating seeds and emerging seedlings and thereby achieve long-lasting plant control. The extended control of plant life during the growth of desirable plants is very often involved in preventing the growth of certain undesirable grasses and weeds, such as crab grass and foxtail. Obviously, a more bountiful growth of desirable grasses and crop plants will result if growth of these undesirable weeds and grasses is prevented before the soil is depleted of moisture and nutrients.

Very useful herbicidal compositions containing certain nuclear-substituted and nitrogen-substituted alpha-haloacetanilides are disclosed and claimed in U.S. Patent 2,863,752, issued to Hamm and Speziale. They discovered that the alpha-haloacetanilides required an alkyl substituent of up to 6 carbon atoms on the amide nitrogen atom and a single alkyl substituent of up to 4 carbon atoms on the aromatic ring in order to produce herbicidal activity. Even though these alpha-haloacetanilides of Hamm and Speziale are effective herbicides, it is desirable in man's continued battle with undesirable plant life to improve the effectiveness of these herbicidal compositions.

I have now discovered, much to my surprise, that the unit activity of the alpha-haloacetanilides is increased and the plant spectrum widened at low rates of application by substituting a tertiary alkyl substituent on the aromatic ring in an ortho position with respect to the amide nitrogen atom and a substituent on the amide carbon atom but not substituting any other substituents on the aromatic ring.

An object of this invention is to provide novel herbicidal compositions containing as an essential ingredient an alpha-haloacetanilide having substituents on only the amide nitrogen atom and an ortho position with respect to said amide nitrogen atom, said last substituent being a tertiary alkyl group.

Another object of this invention is to provide novel herbicidal compositions having a high unit activity and a wide plant spectrum at low rates of application.

Another object of this invention is to provide novel herbicidal compositions useful for soil sterilization at low rates of application.

Another object of this invention is to provide novel herbicidal compositions which exhibit selectivity in affecting certain undesirable plant systems without affecting desirable plant systems.

Another object of this invention is to provide methods for the suppression and control of vegetation.

Another object of this invention is to provide methods for the suppression and control of undesirable vegetation growing intermingled with desirable vegetation.

Another object of this invention is to provide methods for preventing the germination of seeds of undesirable plants and for preventing the growth of undesirable emerging seedlings in soil which is planted with seeds of desirable vegetation.

Another object of this invention is to provide as new compounds certain alpha-haloacetanilides having only a substituent in the amide nitrogen atom and an ortho substituent, said ortho substituent being a tertiary alkyl group.

Other aspects, objects, and advantages of this invention will be apparent from a consideration of the accompanying disclosure and the appended claims.

According to the present invention, there are provided herbicidal concentrate compositions comprising a herbicide adjuvant and an alpha-haloacetanilide of the formula

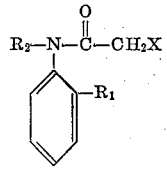

wherein $R_1$ is a tertiary alkyl radical having at least 4 carbon atoms, $R_2$ is selected from the group consisting of primary alkyl, alkenyl, and alkynyl, and X is a halogen atom selected from the group consisting of chlorine, bromine, and iodine.

Also, according to the present invention, there are provided herbicidal compositions comprising a carrier, a herbicide adjuvant and a toxic or growth-inhibiting amount of an alpha-haloacetanilide of the formula as described above.

Also, according to the present invention, there are provided methods for affecting plant systems, including fully developed vegetation as well as germinating seeds and emerging plant seedlings, in a manner to destroy said vegetation and to prevent the growth of said seeds and said emerging seedlings by the application of a toxic or growth-inhibiting amount of an alpha-haloacetanilide of the formula as described above.

Further, according to the present invention, there are provided, as new compounds, alpha-haloacetanilides of the formula as described above.

The alpha-haloacetanilides of this invention have substituents substituted on the amide nitrogen atom and on the aromatic ring in only an ortho position with respect to the amide nitrogen atom. There are no substituents on any other positions on the aromatic ring. The ortho substituent, $R_1$ in the formula above, is a tertiary alkyl radical having at least 4 carbon atoms and, preferably, not more than 10 carbon atoms. This tertiary alkyl radical may also have further chain branching. Examples of some suitable tertiary alkyl radicals include: tert-butyl, tert-amyl, 1,1,2-trimethylpropyl, 1,1-dimethylbutyl, 1,1-dimethylamyl, 1,1,2-trimethylbutyl, 1,1,3-trimethylbutyl, 1,1,3,3-tetramethylbutyl, 1,1,2,3-tetramethylbutyl, 1,1,2,2-tetramethylbutyl and 1,1-dimethyloctyl groups.

The N-substituent, $R_2$ in the formula above, is either a primary alkyl, alkenyl or alkynyl radical. These radicals may have either a straight chain or a branched chain configuration but may not have any secondary or tertiary groups. Preferably, these radicals have not more than 4 carbon atoms. Examples of suitable alkyl radicals include methyl, ethyl, n-propyl, n-butyl, and isobutyl. Examples of some suitable alkenyl radicals include allyl, vinyl, crotyl, and methallyl. Examples of some suitable alkynyl radicals include ethynyl, 1-propynyl, 2-propynyl, 2-butynyl and the like.

The halogen substituent on the alpha-carbon atom of the haloacetanilide, identified by X in the formula above, may be either a chlorine, bromine, or iodine.

The alpha-haloacetanilides of this invention may in general be prepared by haloacetylation of suitable N-substituted and ortho-substituted aromatic amines, which may be prepared for example, by the process disclosed in applications Ser. Nos. 824,488 and 824,455, filed July 2, 1959, now both abandoned, from a primary aromatic amine and a branch-chain olefin. The haloacetylating agent is preferably either a haloacetic anhydride, such as chloroacetic anhydride, or a haloacetyl halide, such as chloroacetyl chloride, bromoacetyl bromide, or the like.

The haloacetylation reaction is preferably conducted in the presence of a suitable liquid reaction medium. The liquid reaction medium must be anhydrous if the acetylating agent is a haloacetic anhydride; however, either anhydrous reaction medium or mediums containing water can be used with haloacetyl halide acetylating agents. Examples of some suitable reaction mediums for use with either acetylating agent include benzene, diethyl ether, hexane, methylethyl ketone, chlorobenzene, toluene, chloroform, and the xylenes. Since an acid or hydrogen halide is eliminated in the haloacetylation reaction, it is also desirable to have an acid acceptor present in the reaction zone to neutralize the acid formed. Suitable acid acceptors for anhydrous solvent systems, include the N-substituted ortho-substituted aromatic amine reactants, which may be present in the reaction zone in an amount greater than that required for the acetylation, tertiary amines and pyridine. Acid acceptors in aqueous solvent systems include alkali or alkaline earth hydroxides and alkali or alkaline earth metal carbonates or bicarbonates.

The haloacetylation reaction is generally carried out at a temperature which is below room temperature, preferably in the range of from 0° C. to 15° C. It is not usually desirable to carry out the reaction at a temperature above room temperature because hydrolysis of the haloacetyl halide takes place and the reaction rate is excessively high. It is generally preferable to carry out the reaction at atmospheric pressure although subatmospheric pressure and superatmospheric pressure can be used. Although the haloacetylation reaction can be carried out using stoichiometric amounts of reactants, it is usually preferable to use from 2 to 5% of an excess of the acetylating agent. The acetanilide products may be separated from the reaction mixture by methods well known to those skilled in the art, such as by distillation or by fractional crystallization from the reaction medium or from solvents in case the desired product is a soluble substance.

The advantages, desirability and usefulness of the present invention are illustrated by the following examples.

EXAMPLE 1

In this example, N-allyl-2'-tert-butyl-2-chloroacetanilide was prepared from chloroacetic anhydride and N-allyl-2-tert-butylaniline which was prepared by reacting 2-tert-butylaniline with 3-bromopropene at a temperature of 95° C. In the chloroacetylation step, 57 g. (0.3 mole) of the N-allyl-2-tert-butylaniline in 125 ml. of toluene was reacted with 103 g. (0.3 mole) of 50% chloroacetic anhydride in chloroform. The reaction was exothermic, causing the temperature of the reaction mixture to rise to 80° C. After standing for 10 minutes, the reaction mixture was washed with water and crystallized from 200 ml. of heptane. From the crystallization step there was obtained 63 g. of the N-allyl-2'-tert-butyl-2-chloroacetanilide which is a colorless solid having a melting point of 71–72° C. Analysis of the product was found to be 13.29% chlorine as compared with the calculated value of 13.34% chlorine.

EXAMPLE 2

In this example, 2'-tert-butyl-2-chloro-N-n-propylacetanilide was prepared by reacting 20.5 g. (0.13 mole) of 2-tert-butyl-N-n-propylaniline dissolved in 75 ml. of chloroform with a 10% excess of chloroacetic anhydride in chloroform. The reaction was moderately exothermic, but additional heat was applied to the reaction mixture for a period of approximately 10 minutes. At the end of this time, the reaction mixture was washed with water, then washed with dilute potassium carbonate solution, and finally distilled under vacuum to obtain a fraction boiling at 200–203° C./17 mm. Hg. Upon crystallization of this fraction from 100 ml. of heptane, there was obtained 21.5 g. of the 2'-tert-butyl-2-chloro-6-n-propylacetanilide which is a colorless solid material having a melting point of 76.3–77° C. Analysis of this product was found to be 67.05% carbon, 8.33% hydrogen and 12.87% chlorine as compared with calculated values of 67.27% carbon, 8.28% hydrogen and 13.24% chlorine.

EXAMPLE 3

In this example, 2'-tert-butyl-2-chloro-N-methylacetanilide was prepared by reacting 50 g. (0.3 mole) of 2-tert-butyl-methylaniline dissolved in 100 ml. of benzene with 0.33 mole of chloroacetic anhydride in chloroform. Although the reaction was moderately exothermic, the reaction mixture was heated for 15 minutes on a hot plate. After standing overnight, the reaction mixture was washed with warm water, then with dilute potassium carbonate solution, and vacuum distilled to obtain a fraction having a boiling point of 118–123° C./0.6 mm. Hg. Upon crystallization of this fraction from 90% methanol, there was obtained 47 g. of the 2′-tert-butyl-2-chloro-N-methylacetanilide which is a colorless solid having a melting point of 98.8–100.2° C.

EXAMPLE 4

In this example, 2′-tert-butyl-2-chloro-N-ethylacetanilide was prepared by reacting 53.2 g. (0.3 mole) of 2-tert-butyl-N-ethylaniline with 0.33 mole of chloroacetic anhydride in chloroform. Although the reaction was moderately exothermic, the reaction mixture was warmed for 10 minutes. At the end of this time, 200 ml. of water was added to the reaction mixture and the solvents removed by distillation. The solid material in the reaction mixture was separated, washed with water, and crystallized from 60% methanol to obtain 60 g. of 2′-tert-butyl-2-chloro-N-ethylacetanilide which is a colorless solid having a melting point of 74.4–75° C. Analysis of this product was found to be 13.76% chlorine as compared with the calculated value of 13.97% chlorine.

EXAMPLE 5

In this example, 2′-tert-butyl-N-isobutyl-2-chloroacetanilide was prepared by reacting 20.5 g. (0.1 mole) of N-isobutyl-2-tert-butylaniline dissolved in 50 ml. of benzene with 0.11 mole of chloroacetic anhydride in chloroform. The reaction mixture was heated on a hot plate for 30 minutes. At the end of this time 150 ml. of water was added to the reaction mixture and the solvents removed by evaporation. The solid material in the reaction mixture was separated, washed with water, and crystallized with 60% methanol to obtain 11 g. of the 2′-tert-butyl-N-isobutyl-2-chloroacetanilide which is a pale-purple solid having a melting point of 90.5–91.5° C. Analysis of this product was found to be 12.40% chlorine as compared with the calculated value of 12.54% chlorine.

EXAMPLE 6

In this example, 2′-tert-butyl-2-chloro-N-(2-propynyl)-acetanilide was prepared by reacting 46 g. (0.24 mole) of 2-tert-butyl-N-(2-propynyl)aniline in 125 ml. of benzene with 51 g. (0.23 mole) of chloroacetic anhydride. The reaction mixture was heated on a hot plate for 30 minutes. At the end of this time, the reaction mixture was washed twice with warm water, once with dilute carbonate solution, and once more with water. Thereafter, the reaction mixture was distilled to obtain a fraction boiling at 165–173° C./1.0 mm. Hg. This fraction was first crystallized from a 4:1 mixture of heptane and toluene and then recrystallized from dilute methanol to obtain 49 g. of the 2′-tert-butyl-2-chloro-N-(2-propynyl)-acetanilide which is an off-white colored solid having a melting point of 110.5–111° C. Analysis of the product was found to be 13.20% chlorine as compared with the calculated value of 13.44% chlorine.

EXAMPLE 7

In this example, the pre-emergent herbicidal ratings of some of the N-substituted ortho-substituted alpha-haloacetanilides of this invention were determined in greenhouse tests in which a specific number of seeds of 12 different plants, each representing a principal botanical type, were planted in greenhouse flats. A good grade of top soil was placed in either 9½″ x 5¾″ x 2¾″ or 9″ x 13″ x 2″ aluminum pans and compacted to a depth of ⅜ inch from the top of the pan. On top of the soil were placed five seeds of each of radish, morning glory, and tomato; 10 seeds of each of sugar beet, sorghum, and bromegrass; 20 seeds of each of wild buckwheat, giant foxtail, ryegrass, and wild oat; approximately 20 to 30 (a volume measure) of each of pigweed and crabgrass; and either 2 or 3 seeds of soybean. Two different type plantings were made; one wherein the herbicidal composition was applied to the surface of the soil and the other wherein the composition was admixed with or incorporated in the top layer of soil. In the surface-application plantings, the seeds were arranged with 3 soybean seeds across the center of the large aluminum pan, the monocotyledon or grass seeds scattered randomly over one-third of the soil surface, and the dicotyledon or broadleaf seeds scattered randomly over the remaining one-third of the soil surface at the other end of the pan. The seeds were then covered with ⅜ inch of prepared soil mixture and the pan leveled. In the soil-incorporation plantings, 450 g. of prepared soil mixture was blended with the herbicide composition in a separate mixing container for covering the seeds which were planted in the smaller of the two aluminum pans. The seeds in this planting were arranged with a soybean seed planted in diagonal corners and the monocotyledon seeds and the dicotyledon seeds each scattered randomly over one-half of the soil surface. The herbicide-incorporated soil mixture was used to cover the seeds. The herbicide composition was applied in the surface-application plantings prior to the watering of the seeds. This application of the herbicide composition was made by spraying the surface of the soil with an acetone solution containing a sufficient quantity of the candidate chemical to obtain the desired rate per acre on the soil surface. The watering of the seeds in both type plantings was accomplished by placing the aluminum pans in a sand bench having ½-inch depth of water thereon and permitting the soil in the pans to absorb moisture through the perforated bottom of the pans.

The planted pans were thereafter placed on a wet sand bench in a greenhouse and maintained there for 14 days under ordinary conditions of sunlight and watering. At the end of this time, the plants were observed and the results recorded by counting the number of plants of each species which germinated and grew. The herbicidal rating was obtained by means of a fixed scale based on the average percent germination of each seed lot. The herbicidal ratings are defined as follows:

0 _____ No phytotoxicity.
1 _____ Slight phytotoxicity.
2 _____ Moderate phytotoxicity.
3 _____ Severe phytotoxicity.

The pre-emergent herbicidal activity of some of the N-substituted ortho-substituted alpha-haloacetanilides of this invention are recorded in Table I for various application rates of the alpha-haloacetanilide in both surface and soil-incorporated applications. In Table I, the various seeds are represented by letters as follows:

A _____ General grass.
B _____ General broadleaf.
C _____ Morning glory.
D _____ Wild oats.
E _____ Bromegrass.
F _____ Ryegrass.
G _____ Radish.
H _____ Sugar beet.
I _____ Foxtail.
J _____ Crabgrass.
K _____ Pigweed.
L _____ Soybean.
M _____ Wild buckwheat.
N _____ Tomato.
O _____ Sorghum.

Individual injury ratings for each plant type are reported in Table I. In addition, the total injury rating for all grass plants and the total injury rating for all broadleaf plants are also reported in Table I. For grasses, the maximum total is 18 for the 6 grass plants at ratings of 3. For broadleafs, the maximum total is 21 for the 7 broadleaf plants at ratings of 3.

TABLE I.—PRE-EMERGENCE HERBICIDAL ACTIVITY OF THE N-SUBSTITUTED ORTHO-SUBSTITUTED ALPHA-HALOACETANILIDES

| Compound | Rate, lb. acre | Plant Type | | | | | | | | | | | | | | | Total Injury Rating | | Comments |
| --- | --- | --- | --- | --- | --- | --- | --- | --- | --- | --- | --- | --- | --- | --- | --- | --- | --- | --- | --- |
| | | A | B | C | D | E | F | G | H | I | J | K | L | M | N | O | Grass | Broadleaf | |
| N-allyl-2'-tert-butyl-2-chloroacetanilide | 25 | 3 | 3 | 2 | 3 | 3 | 3 | 0 | 3 | 3 | 3 | 3 | 2 | 3 | 3 | 3 | 18 | 16 | (1) |
| | 5 | 3 | 0 | 0 | 3 | 3 | 3 | 0 | 0 | 3 | 3 | 3 | 1 | 0 | 1 | 3 | 18 | 5 | (2) |
| | 1 | 3 | 0 | 1 | 1 | 3 | 3 | 0 | 0 | 3 | 3 | 3 | 1 | 0 | 0 | 3 | 16 | 5 | (2) |
| 2'-tert-Butyl-2-chloro-N-n-propylacetanilide | 25 | 3 | 2 | 0 | 3 | 3 | 3 | 1 | 3 | 3 | 3 | 3 | 1 | 0 | 2 | 3 | 18 | 10 | (1) |
| | 5 | 3 | 0 | 0 | 1 | 3 | 3 | 0 | 1 | 3 | 3 | 3 | 1 | ---- | 0 | 3 | 16 | 1 5 | (2) |
| | 1 | 2 | 0 | 0 | 0 | 0 | 3 | 0 | 1 | 3 | 2 | 2 | 1 | ---- | 0 | 2 | 10 | 1 4 | (2) |
| 2'-tert-Butyl-2-chloro-N-methylacetanilide | 25 | 3 | 3 | 3 | 3 | 3 | 3 | 2 | 3 | 3 | 3 | 3 | 0 | ---- | 3 | 3 | 18 | 1 14 | (1) |
| | 5 | 3 | 3 | 3 | 3 | 3 | 3 | 2 | 3 | 3 | 3 | 3 | 3 | ---- | 3 | 3 | 18 | 1 17 | (1) |
| | 1 | 3 | 3 | 3 | 3 | 3 | 3 | 1 | 3 | 3 | 3 | 3 | 0 | 3 | 3 | 3 | 18 | 16 | (2) |
| | 0.25 | 3 | 0 | 2 | 2 | 3 | 3 | 0 | 1 | 3 | 3 | 0 | 0 | 0 | 0 | 3 | 17 | 3 | (2) |
| | 0.05 | 2 | 0 | 0 | 0 | 0 | 2 | 0 | 1 | 3 | 3 | 2 | 0 | 1 | 0 | 1 | 9 | 4 | (2) |
| 2'-tert-Butyl-2-chloro-N-ethylacetanilide | 25 | 3 | 3 | 3 | 3 | 3 | 3 | 2 | 3 | 3 | 3 | 3 | 0 | ---- | 3 | 3 | 18 | 1 14 | (1) |
| | 5 | 3 | 3 | 3 | 3 | 3 | 3 | 1 | 3 | 3 | 3 | 3 | 1 | ---- | 2 | 3 | 18 | 1 13 | (1) |
| | 1 | 3 | 0 | 0 | 3 | 3 | 3 | 0 | 0 | 3 | 3 | 3 | 0 | 0 | 0 | 3 | 18 | 3 | (2) |
| | 0.25 | 2 | 0 | 0 | 0 | 1 | 3 | 0 | 0 | 3 | 2 | 2 | 0 | 0 | 0 | 1 | 10 | 2 | (2) |
| 2'-tert-Butyl-N-isobutyl-2-chloroacetanilide | 5 | 2 | 2 | 2 | 0 | 0 | 3 | 0 | 3 | 3 | 3 | 3 | ---- | 0 | 0 | 2 | 11 | 1 8 | (1) |
| 2'-tert-Butyl-2-chloro-N-(2-propynyl) acetanilide | 5 | 3 | 3 | 3 | 3 | 3 | 3 | 0 | 3 | 3 | 3 | 3 | 3 | 0 | 3 | 3 | 18 | 15 | (1) |
| | 1 | 2 | 0 | 0 | 1 | 0 | 3 | 0 | 0 | 3 | 2 | 0 | 0 | 0 | 0 | 2 | 12 | 2 | (2) |
| | 0.25 | 2 | 0 | 0 | 1 | 1 | 2 | 0 | 0 | 2 | 3 | 0 | 0 | 0 | 0 | 1 | 10 | 0 | (2) |

1 One species missing.
(1) Surface application.
(2) Incorporated in soil.

The data in Table I illustrate the general herbicidal activity as well as the selective activity of some of the N-substituted ortho-substituted alpha-haloacetanilides of this invention. It will be noted that haloacetanilides substituted with a tertiary alkyl group ortho to the amide nitrogen atom and a N-substituent demonstrate very outstanding general herbicidal activity at low rates of application. Thus, these alpha-haloacetanilides are particularly useful in soil sterilization applications. It will also be noted from the data in Table I that unusual grass specificity can be obtained at lower levels of application. Such grass specificity is achieved at extremely low application rates, for example, at rates as low as 0.05 lb. per acre with 2'-tert-butyl-chloro-N-methylacetanilide, so that very economical treatment is possible. The three botanical types or genera of grasses effectively controlled by the N-substituted ortho-substituted alpha-haloacetanilides of this invention embrace a large number of undesirable plants, or weeds, frequently found in vegetable crops. But these alpha-haloacetanilides are not limited to removing grasses from broadleaf plants, since the selective action is such that certain genera of grasses can be removed from corn, which is also a genus of grass. These alpha-haloacetanilides are also effective in killing nut grass, i.e., *Cyperus rotundus* and *Cyperus esculentus*.

EXAMPLE 8

In this example, the lack of herbicidal activity of closely related compounds which do not have the structure of the N-substituted ortho-substituted alpha-haloacetanilides of this invention is demonstrated. Pre-emergent greenhouse tests were used in this example and the planting of the seeds was accomplished in the same manner as described in Example 7. The data obtained are reported in Table II wherein the identification of the seeds is the same as that in the previous example and the herbicidal ratings given also have the same definition.

TABLE II.—COMPARISON OF PRE-EMERGENCE HERBICIDAL ACTIVITY OR VARIOUS ALPHA—HALOACETANILIDES

| Compound | Plant Type | | | | | | | | | | | | | | | Total Injury Rating | | Comments |
| --- | --- | --- | --- | --- | --- | --- | --- | --- | --- | --- | --- | --- | --- | --- | --- | --- | --- | --- |
| | A | B | C | D | E | F | G | H | I | J | K | L | M | N | O | Grass | Broadleaf | |
| 2'-tert-Butyl-2-chloro-N-methylacetanilide | 3 | 3 | 3 | 3 | 3 | 3 | 1 | 3 | 3 | 3 | 3 | 0 | 3 | 3 | 3 | 18 | 16 | At 1 lb./acre. |
| 4'-tert-Butyl-2-chloro-N-methylacetanilide | 0 | 0 | 0 | 0 | 0 | 0 | 0 | 0 | 0 | 0 | 0 | 0 | 0 | 0 | 0 | 0 | 0 | Do. |
| 2'-tert-Butyl-2-chloro-N-methylacetanilide | 3 | 3 | 3 | 3 | 3 | 3 | 1 | 3 | 3 | 3 | 3 | 0 | 3 | 3 | 3 | 18 | 16 | Do. |
| 2-chloro-N,2'-dimethyl acetanilide | 3 | 0 | 3 | 3 | 3 | 3 | 0 | 0 | 3 | 3 | 3 | 2 | 0 | 0 | 2 | 17 | 2 | Do. |
| 2'-tert-Butyl-2-chloro-N-ethylacetanilide | 3 | 3 | 3 | 3 | 3 | 3 | 1 | 3 | 3 | 3 | 3 | 1 | ---- | 2 | 3 | 18 | 1 13 | At 5 lb./acre. |
| 2-chloro-N-ethyl-2'-methylacetanilide | 3 | 0 | 0 | 3 | 3 | 3 | 0 | 1 | 3 | 3 | 3 | 0 | 0 | 1 | 3 | 18 | 5 | Do. |
| 2'-tert-Butyl-2-chloro-N-methylacetanilide | 3 | 3 | 3 | 3 | 3 | 3 | 1 | 3 | 3 | 3 | 3 | 0 | 3 | 3 | 3 | 18 | 16 | At 1 lb./acre. |
| 2'-tert-Butyl-2-chloro-acetanilide | 1 | 0 | 0 | 0 | 0 | 0 | 0 | 0 | 3 | 0 | 0 | 0 | 0 | 0 | 0 | 3 | 0 | Do. |
| 4'-tert-Butyl-2-chloro-acetanilide | 0 | 0 | 0 | 0 | 0 | 0 | 0 | 0 | 0 | 0 | 0 | 0 | 0 | 0 | 0 | 0 | 0 | At 25 lb./acre. |
| 2'-tert-Butyl-2-chloro-N-methylacetanilide | 3 | 3 | 3 | 3 | 3 | 2 | 3 | 3 | 3 | 3 | 3 | 3 | ---- | 3 | 3 | 18 | 1 17 | At 5 lb./acre. |
| 2'-tert-Butyl-2-chloro-4'-methylacetanilide | 0 | 0 | 0 | 0 | 0 | 0 | 0 | 0 | 0 | 0 | 0 | 0 | 0 | 0 | 0 | 0 | 0 | Do. |
| 2'-tert-Butyl-N-isobutyl-2-chloroacetanilide | 2 | 2 | 2 | 0 | 0 | 3 | 0 | 3 | 3 | 3 | 3 | ---- | 0 | 0 | 2 | 11 | 1 8 | Do. |
| N,2'-di-tert-Butyl-2-chloracetanilide | 0 | 0 | 0 | 0 | 0 | 0 | 0 | 0 | 0 | 0 | 0 | 0 | 0 | 0 | 0 | 0 | 0 | Do. |
| 2'-tert-Butyl-N-isobutyl-2-chloracetanilide | 2 | 2 | 2 | 0 | 0 | 3 | 0 | 3 | 3 | 3 | 3 | ---- | 0 | 0 | 2 | 11 | 1 8 | Do. |
| 2'-tert-Butyl-2-chloro-N-(1-methylpropyl) acetanilide | 0 | 0 | 0 | 0 | 0 | 2 | 0 | 0 | 0 | 2 | 0 | ---- | 0 | 0 | 0 | 4 | 1 0 | Do. |

1 One species missing.

The first comparison in Table II demonstrates the detrimental affect on herbicidal unit activity in moving the tertiary alkyl group from the ortho position to the para position on the aromatic ring. 2'-tert-butyl-2-chloro-N-methylacetanilide, an acetanilide of this invention, has very severe phytotoxicity at an application rate of 1 lb./acre; however, 4'-tert-butyl-2-chloro-N-methylacetanilide, an acetanilide having the tert-butyl group in the para position, has no herbicidal activity at the same rate of application of 1 lb./acre.

The second comparison reported in Table II demonstrates the unusual improvement in broadleaf unit activity obtained by substituting a tertiary alkyl instead of a primary alkyl on the aromatic ring in the ortho position. Thus, 2'-tert-butyl-2-chloro-N-methylacetanilide, having a tert-butyl group in the ortho position, has a general grass rating of 3 and a general broadleaf rating of 3 at an application rate of 1 lb./acre whereas 2-chloro-N-2'-dimethylacetanilide, having a methyl group in the ortho position, has a general grass rating of 3 but a broadleaf rating of 0 at the same rate of application. Similar results were also obtained with an ethyl group instead of a methyl group substituted on the amide nitrogen atom; that is, 2-chloro-N-ethyl-2'-methylacetanilide had no broadleaf activity at an application rate of 5 lb./acre but 2'-tertbutyl-2-chloro-N-ethylacetanilide had a general broadleaf rating of 3 at the same application rate.

In the third comparison reported in Table II the necessity for the alkyl group substituted on the amide nitrogen atom is demonstrated. 2'-tert-butyl-2-chloro-N-methylacetanilide, having a methyl group substituted on the amide nitrogen atom, had severe phytotoxicity at an application rate of 1 lb./acre; however, 2'-tert-butyl-2-chloroacetanilide, having no methyl group substituted on the amide nitrogen atom, has almost no phytotoxicity at the same rate of application. Also, moving the tert-butyl group of the last-named acetanilide from the ortho position to the para position did not improve the herbicidal activity; in fact, no herbicidal activity was found at a high rate of application of 25 lb./acre as reported for 4'-tert-butyl-2-chloroacetanilide.

In the fourth comparison reported in Table II, the N-substituent was removed from the amide nitrogen atom and substituted on the aromatic ring. The acetanilide thus formed, 2'-tert-butyl-2-chloro-4'-methylacetanilide, had no herbicidal activity at a rate of application of 5 lb./acre even though the acetanilide of this invention, 2'-tert-butyl-2-chloro-N-methylacetanilide had severe phytotoxicity at the same rate of application.

The next comparison demonstrates that the N-substituent cannot be a tertiary alkyl substituent. Thus, N,2'-di-tert-butyl-2-chloroacetanilide, having a tert-butyl group substituted on the amide nitrogen atom, has no phytotoxicity at a rate of application of 5 lb./acre whereas 2'-tert-butyl-N-isobutyl-2-chloroacetanilide, having a primary alkyl substituent substituted on the amide nitrogen atom, has high phytotoxicity at the same rate of application even though the N-substituent is branched-chain.

The last comparison in Table II demonstrates that the N-substituent also may not be a secondary alkyl substituent. Like the previous comparison, 2'-tert-butyl-2-chloro-N-(1-methylpropyl)acetanilide, having a sec-butyl group on the amide nitrogen atom, has almost no phytotoxicity at an application rate of 5 lb./acre but the related acetanilide with an isobutyl substituent on the amide nitrogen atom, 2'-tert-butyl-N-isobutyl-2-chloroacetanilide has high phytotoxicity at the same rate of application.

The data in this example very clearly demonstrate the critical effect on herbicidal activity of not only the nature of the N-alkyl and nuclear-alkyl substituents but also the location of the nuclear-alkyl substituents with respect to the amide nitrogen atom. In order to have high unit activities and wide plant spectrums the alpha-haloacetanilide must be one which has a tertiary alkyl group ortho with respect to the amide nitrogen atom and a substituent on the amide nitrogen atom which is free of secondary and tertiary alkyl groups.

EXAMPLE 9

In this example, the contact herbicidal activity of some of the alpha-haloacetanilides of this invention was determined in greenhouse tests. The alpha-haloacetanilide to be tested was applied in spray form to 21-day-old specimens of the same grasses and broadleaf plants as used in the preemergent tests described in Example 7. The same number of seeds of the same plants used in Example 7 were planted in the 9½" x 5¾" x 2¾" aluminum pans arranged in the same manner with a soybean seed in diagonal corners as described in Example 7. After the plants were 21 days old, each aluminum pan was sprayed with 6 ml. of a 0.5% concentration solution of the candidate chemical, corresponding to a rate of approximately 9 lbs. per acre. This herbicidal solution was prepared from 1.5 ml. of a 2% solution of the candidate compound in acetone, 0.2 ml. of a 3:1 cyclohexanone-emulsifying agent mix, and sufficient water to make a volume of 6 ml. The emulsifying agent was a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants were then observed 14 days later and are reported in Table III. The herbicidal ratings recorded in Table III have the same meaning as stated in Example 7.

TABLE III.—CONTACT HERBICIDAL ACTIVITY OF CERTAIN ORTHO-SUBSTITUTED ALPHA-HALOACETANILIDES

| Compound | General Grass | General Broadleaf |
|---|---|---|
| N-allyl-2'-tert-butyl-2-chloroacetanilide | 1 | 1 |
| 2'tert-Butyl-2-chloro-N-n-propylacetanilide | 1 | 2 |
| 2'tert-Butyl-2-chloro-N-methylacetanilide | 3 | 3 |
| 2'-tert-Butyl-2-chloro-N-ethylacetanilide | 3 | 1 |

EXAMPLE 10

In this example, the pre-emergence activity of 2'-tert-butyl-2-chloro-N-methylacetanilide was determined in a field test. For this test, an emulsifiable concentrate containing 1 lb./gal of the active compound and having a solution point of 8° C. was prepared having the following analysis:

| | Wt. percent |
|---|---|
| 2'-tert-butyl-2-chloro N-methylacetanilide (98% pure) | 13.31 |
| Xylene | 40.85 |
| Cyclohexanone | 40.84 |
| Surface Active Agent A[1] | 5.00 |
| | 100.00 |

[1] Surface active agent A is a nonionic-anionic blend of a long-chain alkylphenol-ethylene oxide condensate (5–15 moles) and an alkylarylsulfonate available from Antara Chemicals Company as Antarate 9181.

Certain crop plants and weed plants (listed in Table IV) were planted in 100-ft. rows one foot apart at Hazelwood, Mo., in the spring. The emulsifiable concentrate was applied the day following the planting parallel to the rows at a decreasingly logarithmic rate starting at 6 lbs./acre at one end of the rows and decreasing to 0.015 lb./acre at the other end of the rows. Water was used as the carrier in applying the concentrate. The plants were inspected approximately 3 weeks and 6 weeks after planting to pinpoint the minimum rates at which slight injury and complete kill occurred. The data obtained are reported in Table IV.

TABLE IV.—PRE-EMERGENCE FIELD TEST OF 2'-TERT-BUTYL-2-CHLORO-N-METHYLACETANILIDE

| | Rate for Complete Kill, lb./acre | Rate for Slight Injury, lb./acre |
|---|---|---|
| Crops: | | |
| Cantaloupe | [1]6 | 2.3 |
| Tomato | 2.9 | 0.24 |
| Cotton | [1]6 | 1.9 |
| Flax | 5.5 | 0.85 |
| Soybean | 5.4 | 0.42 |
| Snapbean | 5.7 | 0.30 |
| Peas | | [1]6 |
| Alfalfa | [1]6 | 0.51 |
| Radish | 5.7 | 3.9 |
| Sugarbeet | 5.1 | 0.85 |
| Corn | | [1]6 |
| Oats | [1]6 | 0.76 |
| Barley | [1]6 | 2.5 |
| Weeds: | | |
| Horsenettle | [1]6 | 1.39 |
| Pigweed | [1]6 | 0.23 |
| Lamb's-quarter | [1]6 | 2.5 |
| Smartweed | 4.3 | 1.14 |
| Johnson Grass | 2.74 | 0.29 |
| Barnyard Grass | 0.98 | 0.19 |
| Crabgrass | 1.1 | 0.02 |
| Brome | 0.63 | 0.09 |

[1] Means greater than 6.

The herbicidal compositions of this invention are either particulate solid (i.e., dusts) or liquid concentrate compositions comprising the active ingredient and either a particulate solid or liquid herbicidal adjuvant which are formulation aids or conditioning agents permitting the concentrate composition to be readily mixed with a suitable solid or liquid carrier in the field for application of the active ingredient on soil or plant surfaces in a toxic concentration in a form which enables prompt assimilation by the germinating seeds, emerging seedlings, or full grown plants. Thus, the herbicidal compositions of this invention include not only the concentrate compositions comprising the active ingredient and the herbicidal adjuvant but also herbicidal toxicant compositions applied in the field comprising the concentrate composition (i.e., active ingredient plus herbicidal adjuvant) and the carrier.

As demonstrated in the examples above, quite different effects can be obtained by modifying the method of use of the herbicidal composition of this invention. Thus, unusual grass specificity can be achieved at lower levels of application whereas at higher levels of application a more general herbicidal effect or soil sterilization takes place. Therefore, an essential part of this invention is the formation of the herbicidal composition so as to permit a uniform predetermined application of the composition to the plant environment to produce the desired effect.

Herbicidal adjuvants useful in preparing the concentrate compositions and, therefore, the herbicidal toxicant compositions applied to the soil or plants, include particulate solid or liquid extending agents such as solvents or diluents within which the active ingredient is dissolved or suspended wetting or emulsifying agents which serve in providing uniform dispersions or solutions of the active ingredient in the extending agents, and adhesive agents or spreading agents which improve the contact of the active ingredient with the soil or plant surfaces. All herbicidal compositions of this invention include at least one of the above types of herbicidal adjuvants and usually include an extending agent and a wetting or emulsifying agent because of the nature of the physical properties of the alpha-haloacetanilides of this invention.

In general, the alpha-haloacetanilides of this invention are insoluble in water and are not readily soluble in many organic solvents. Therefore, the choice of a liquid extending agent is somewhat limited if it is desired that the active ingredient be in solution in the extending agent. The active ingredient need not be dissolved in the extending agent but may merely be dispersed or suspeded in the extending agent as a suspension or emulsion. Also, the alpha-haloacetanilides may first be dissolved in a suitable organic solvent and the organic solution of the active ingredient then incorporated in water or an aqueous extending agent to form a heterogeneous dispersion. Examples of some suitable organic solvents for use as extending agents include hexane, benzene, toluene, acetone, cyclohexanone, methylethylketone, isopropanol, butanediol, methanol, diacetone alcohol, xylene, dioxane, isopropyl ether, ethylene dichloride, tetrachloroethane, hydrogenated naphthalene, solvent naphtha, petroleum fractions (e.g., those boiling almost entirely under 400° F. at atmospheric pressure and having flash points above about 80° F., particularly kerosene), and the like. Where true solutions are desired, mixtures of organic solvents have been found to be useful, for example, 1:1 and 1:2 mixtures of xylene and cyclohexanone.

Solid extending agents in the form of particulate solids are very useful in the practice of the present invention because of the low solubility properties of the alpha-haloacetanilides of this invention. In using this type of extending agent, the active ingredient is either adsorbed or dispersed on or in the finely divided solid material. Preferably the solid extending agents are not hygroscopic but are materials which render the composition permanently dry and free flowing. Suitable solid extending agents include the natural clays, such as china clays, the bentonites and the attapulgites; other minerals in natural state, such as talc, pyrophyllite, quartz, diatomaceous earth, fuller's earth, chalk, rock phosphate, kaolin, kieselguhr, volcanic ash, salt, and sulfur; the chemically modified minerals, such as acid-washed bentonite, precipitated calcium phosphate, precipitated calcium carbonate, calcined magnesia, and colloidal silica; and other solid materials such as powdered cork, powdered wood, and powdered pecan or walnut shells. These materials are used in finely divided form, at least in a size range of 20–40 mesh and preferably in much finer size.

The particulate solid concentrate compositions are applied to the soil by admixture at the time of application with a particulate solid carrier material. If desired, this concentrate composition can also be applied as a wettable powder using a liquid carrier material. When used by this method, a wetting agent or surface active agent is added to the concentrate composition in order to render the particulate solid extending agent wettable by water to obtain a stable aqueous dispersion or suspension suitable for use as a spray. Also, the extending agent applied as a wettable powder is used in very finely divided form, preferably in a size as small as 100 mesh or smaller.

The surface active agent, that is the wetting, emulsifying, or dispersion agent, used in the herbicidal composition of this invention to serve in providing uniform dispersions of all formulation components of both liquid and dust types in both the concentrate compositions and the toxicant compositions applied, may be either anionic, cationic, or nonionic types, including mixtures thereof. Suitable surface active agents are the organic surface active agents capable of lowering the surface tension of water and include the conventional soaps, such as the water-soluble salts of long-chain carboxylic acids; the amino soaps, such as the amine salts of long-chain carboxylic acids; the sulfonated animal, vegetable, and mineral oils; quaternary salts of high molecular weight acids; rosin soaps, such as salts of abietic acid; sulfuric acid salts of high molecular weight organic compounds; align soaps; ethylene oxide condensated with fatty acids, alkyl phenols and mercaptans; and other simple and polymeric compositions having both hydrophilic and hydrophobic functions.

The herbicidal concentrate compositions of this invention ordinarily have the active ingredient and the surface active agent present in higher concentrations than the toxicant compositions applied in the field so that upon dilution with the liquid or solid carrier, compositions containing optimum proportions of active ingredient and surface active agent are prepared to obtain uniform distribution and to maintain the active ingredient in a form which enables the prompt assimilation by the plant.

The liquid concentrate compositions of this invention preferably comprise 5% to 95% by weight of the active ingredient and the remainder the herbicidal adjuvant, which may be solely liquid extending agent or surface active agent (including adhesive agent), but preferably is a combination of liquid extending agent and surface active agent. Preferably, the surface active agent comprises from 0.1% to 15% by weight of the total concentrate composition. The remainder of the composition is the liquid extending agent.

Use of the surface active agent is necessary in the formulation of liquid concentrate compositions in order to obtain a composition containing a sufficient concentration of the difficultly soluble alpha-haloacetanilide in the liquid extending agent. However, the liquid extending agent must be selected not only on the basis of the amount of the alpha-haloacetanilide dissolved but also upon the basis of the solution temperature of the total composition. Thus, in some formulations, a particular combination of solvents give a sufficiently low solvent temperature but the amount of the alpha-haloacetanilide dissolved or dispersed in the mixture is insufficient and a suitable surface active agent must be selected in order that more alpha-haloacetanilide can be dispersed in the composition. Preferably, the concentrate composition has a solution temperature below 0° C. although compositions having solution temperatures as high as 20° C. can be used.

The concentration of alpha-haloacetanilide in the particulate solid or dust concentrate composition of this invention may vary over wide ranges depending upon the nature of the solid extending agent and the intended use of the composition. Since the alpha-haloacetanilides of this invention have very high toxicities and are applied at very low rates in order to obtain selectivity, the concentration of the active ingredient in the dust composition may be very low and may comprise as little as 1% or less by weight of the total dust composition. By contrast, when the dust composition is to be used for soil sterilization, it may be desirable to have a very high concentration of active ingredient and for such use the active ingredient may comprise as much as 5% to 98% by weight of the total composition. The remainder of the composition is the herbicidal adjuvant which is usually only the particulate solid extending agent. Thus, the surface active agent is not usually required in dust concentrate compositions although it can be used if desired. However, if the dust concentrate composition is to be applied as a wettable powder, surface active agent must be added to the concentrate composition and ordinarily the amount of surface active agent will be in the range of 0.1% to 15% by weight of the composition.

The carrier material, used for the uniform distribution of the alpha-haloacetanilide in a herbicidally effective amount to inhibit the growth of either all or selected plants, may be either a liquid or a particulate solid material. The liquid and solid extending agents used to prepare the concentrate composition may also be used as the carrier; however, the use of these materials as a carrier is often not economical. Therefore, water is the preferred liquid carrier, both for use with the liquid concentrate composition and the wettable powder concentrate. Suitable particulate solid carriers include the particulate extending agents noted above as well as the solid fertilizers such as ammonium nitrate, urea, and superphosphate, as well as other materials in which plant organisms may take root and grow, such as compost, manure, humus, sand and the like.

The liquid and dust concentrate compositions of this invention can also contain other additaments such as fertilizer and pesticides. Also, these additaments may be used as, or in combination with, the carrier materials.

The herbicidal compositions of this invention are applied to the plant systems in the conventional manner. Thus, the dust and liquid compositions may be applied to the foliage of growing plants by the use of power dusters, broom and hand sprayers, and spray dusters. The composions can also be very suitably applied from airplanes as a dust or a spray because the herbicidal compositions of this invention are effective in very low dosages. In order to prevent growth of germinating seeds or emerging seedlings, the dust and liquid compositions are applied to the soil according to conventional methods, and, preferably, distributed in the soil to a depth of at least ½ inch below the soil surface. It is not absolutely necessary that the herbicidal compositions be admixed with the soil particles and these compositions can be applied merely by spraying or sprinkling onto the surface of the soil. The herbicidal compositions of this invention can also be applied by addition to irrigation water supplied to the field to be treated. This method of application permits the penetration of the compositions into the soil as the water is absorbed therein. Dust compositions sprinkled on the surface of the soil can be distributed below the surface of the soil by the usual discing, dragging, or mixing operations.

The application of a growth-inhibiting amount of the alpha-haloacetanilide to the plant system is essential in the practice of the present invention. The exact dosage to be applied is dependent not only upon the specific alpha-haloacetanilide but also upon the particular plant species to be controlled and the stage of growth thereof as well as the part of the plant to be contacted with the toxicant. In nonselective foliage treatments, the herbicidal compositions of this invention are usually applied at a rate sufficient to obtain from 5 to 50 lbs. of alpha-haloacetanilide per acre but lower or higher rates might be applied in some cases. In non-selective pre-emergent treatments, these herbicidal compositions are usually applied at a somewhat lower rate than in foliage treatments but at a rate which is ordinarily within the same general range; that is, at a rate in the range of 1 to 25 lbs. per acre. However, because of the unusually high unit activity possessed by the alpha-haloacetanilides of this invention, soil sterilization is ordinarily accomplished at a rate of application in the range of 3–9 lbs. per acre. In selective pre-emergent applications to the soil, a dosage of from 0.05 to 5 lbs. of active ingredient per acre is usually employed but lower or higher rates may be necessary in some instances. It is believed that one skilled in the art can readily determine from this disclosure, including the examples, the optimum rate to be applied in any particular case.

Although the active ingredient in the herbicidal compositions of this invention is preferably a N-substituted ortho-substituted alpha-haloacetanilide as described in this specification, other alpha-haloacetanilides having other nuclear alkyl or halo substitution and/or no amide nitrogen substitution may also be present in the herbicidal compositions and contribute to the activity of the composition. However, the essential active ingredient of the herbicidal compositions of this invention is the N-substituted ortho-substituted alpha-haloacetanilide disclosed in this specification. Of course, one skilled in the art will understand that mixtures of various N-substituted ortho-substituted alpha-haloacetanilides can also be used.

Reasonable variation and modification of the invention as described are possible, the essence of which is that there have been provided (1) herbicidal concentrate compositions comprising a herbicidal adjuvant and, as an essential active ingredient, a N-substituted ortho-substituted alpha-haloacetanilide, (2) herbicidal toxicant compositions comprising a herbicidal adjuvant, a carrier, and, as an essential active ingredient, a toxic or growth-inhibiting amount of a N-substituted ortho-substituted alpha-haloacetanilide, (3) methods for suppression and control of undesirable vegetation, including full grown plants as well as germinating seeds and emerging seedlings, by the application of a N-substituted ortho-substituted alpha-haloacetanilide thereto, and (4) certain N-substituted ortho-substituted alpha-haloacetanilides as new compounds.

I claim:

1. A herbicidal concentrate composition comprising a herbicidal adjuvant and, as an essential active ingredient, an effective amount of an alpha-haloacetanilide of the formula

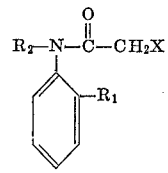

wherein $R_1$ is a tertiary alkyl radical having at least 4 carbon atoms, $R_2$ is selected from the group consisting of primary alkyl, alkenyl and alkynyl, and X is a halogen atom selected from the group consisting of chlorine, bromine, and iodine.

2. The herbicidal concentrate composition of claim 1 wherein said $R_2$ is primary alkyl.

3. The herbicidal concentrate composition of claim 1 wherein said $R_2$ is alkenyl.

4. The herbicidal concentrate composition of claim 1 wherein said $R_2$ is alkynyl.

5. A herbicidal concentrate composition comprising a herbicidal adjuvant and, as an essential active ingredient, an effective amount of N - allyl - 2' - tert-butyl-2-chloroacetanilide.

6. A herbicidal concentrate composition comprising a herbicidal adjuvant and, as an essential active ingredient, an effective amount of 2'-tert-butyl-2-chloro-N-n-propyl-acetanilide.

7. A herbicidal concentrate composition comprising a herbicidal adjuvant and, as an essential active ingredient, an effective amount of 2'-tert-butyl-2-chloro-N-methyl-acetanilide.

8. A herbicidal concentrate composition comprising a herbicidal adjuvant and, as an essential active ingredient, an effective amount of 2'-tert-butyl-2-chloro-N-ethylacet-anilide.

9. A herbicidal concentrate composition comprising a herbicidal adjuvant and, as an essential active ingredient, an effective amount of 2'-tert-butyl-N-isobutyl-2-chloro-acetanilide.

10. A herbicidal concentrate composition comprising a herbicidal adjuvant and, as an essential active ingredient, an effective amount of 2' - tert - butyl - 2 - chloro - N - (2-propenyl)acetanilide.

11. A herbicidal toxicant composition comprising a herbicidal adjuvant, a carrier, and, as an essential active ingredient, a growth-inhibiting amount of an alpha-halo-acetanilide of the formula

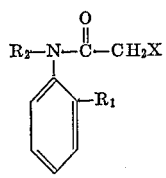

wherein $R_1$ is a tertiary alkyl radical having at least 4 carbon atoms, $R_2$ is selected from the group consisting of primary alkyl, alkenyl, and alkynyl, and X is a halogen atom selected from the group consisting of chlorine, bromine, and iodine.

12. A herbicidal method which comprises applying to soil an effective amount of an alpha-haloacetanilide of the formula

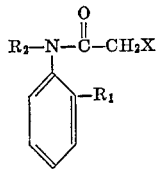

wherein $R_1$ is a tertiary alkyl radical having at least 4 carbon atoms, $R_2$ is selected from the group consisting of primary alkyl, alkenyl, and alkynyl, and X is a halogen atom selected from the group consisting of chlorine, bromine, and iodine.

13. A method of claim 12 wherein $R_2$ is primary alkyl.
14. A method of claim 12 wherein $R_2$ is alkenyl.
15. A method of claim 12 wherein $R_2$ is alkynyl.
16. A method of claim 12 wherein the alpha-haloacet-anilide is N-allyl-2'-tert-butyl-2-chloroacetanilide.
17. A method of claim 12 wherein the alpha-haloacet-anilide is 2'-tert-butyl-2-chloro-N-n-propylacetanilide.
18. A method of claim 12 wherein the alpha-haloacet-anilide is 2'-tert-butyl-2-chloro-N-methylacetanilide.
19. A method of claim 12 wherein the alpha-haloacet-anilide is 2'-tert-butyl-2-chloro-N-ethylacetanilide.
20. A method of claim 12 wherein the alpha-haloacet-anilide is 2'-tert-butyl-N-isobutyl-2-chloroacetanilide.
21. A method of claim 12 wherein the alpha-haloacet-anilide is 2' - tert - butyl - 2-chloro-N-(2-propenyl) acet-anilide.
22. A method of claim 12 wherein the alpha-haloacet-anilide is applied at a rate from about 0.05 to about 50 pounds per acre.

23. A herbicidal method which comprises applying to plants an effective amount of an alpha-haloacetanilide of the formula

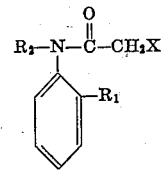

wherein $R_1$ is a tertiary alkyl radical having at least 4 carbon atoms, $R_2$ is selected from the group consisting of primary alkyl, alkenyl and alkynyl, and X is a halogen atom selected from the group consisting of chlorine, bromine, and iodine.

24. A method of claim 23 wherein $R_2$ is primary alkyl.
25. A method of claim 23 wherein $R_2$ is alkenyl.
26. A method of claim 23 wherein $R_2$ is alkynyl.
27. A method of claim 23 wherein the alpha-haloacet-anilide is N-allyl-2'-tert-butyl-2-chloroacetanilide.
28. A method of claim 23 wherein the alpha-haloacet-anilide is 2'-tert-butyl-2-chloro-N-n-propylacetanilide.
29. A method of claim 23 wherein the alpha-haloacet-anilide is 2'-tert-butyl-2-chloro-N-methylacetanilide.
30. A method of claim 23 wherein the alpha-haloacet-anilide is 2'-tert-butyl-2-chloro-N-ethylacetanilide.
31. A method of claim 23 wherein the alpha-haloacet-anilide is 2'-tert-butyl-N-isobutyl-2-chloroacetanilide.
32. A method of claim 23 wherein the alpha-haloacet-anilide is 2'-tert-butyl-2-chloro-N-(2-propenyl)acetanilide.
33. A method of claim 23 wherein the alpha-haloacet-anilide is applied at a rate from about 0.05 to about 50 pounds per acre.

References Cited

UNITED STATES PATENTS 3,268,584   8/1966   Olin _____ 71—118

FOREIGN PATENTS 139,051   11/1949   Sweden.

LEWIS GOTTS, Primary Examiner
CATHERINE L. MILLS, Assistant Examiner

U.S. Cl. X.R.
260—562